(12) United States Patent
Spatz

(10) Patent No.: US 7,704,404 B2
(45) Date of Patent: Apr. 27, 2010

(54) REFRIGERANT COMPOSITIONS AND USE THEREOF IN LOW TEMPERATURE REFRIGERATION SYSTEMS

(75) Inventor: Mark W Spatz, East Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/891,861

(22) Filed: Jul. 15, 2004

(65) Prior Publication Data

US 2010/0019190 A1     Jan. 28, 2010

Related U.S. Application Data

(60) Provisional application No. 60/488,042, filed on Jul. 17, 2003.

(51) Int. Cl.
*C09K 5/04*     (2006.01)

(52) U.S. Cl. ......................................................... 252/67

(58) Field of Classification Search .................. 252/67, 252/68
See application file for complete search history.

(56) References Cited

U.S. PATENT DOCUMENTS

| | | | | |
|---|---|---|---|---|
| 5,185,094 A | 2/1993 | Schiflett | ....................... | 252/67 |
| 5,370,811 A | 12/1994 | Yoshida et al. | ................. | 252/67 |
| 5,438,849 A | 8/1995 | Yoshida et al. | ................. | 62/498 |
| 5,643,492 A | 7/1997 | Schiflett | ....................... | 252/67 |
| 5,709,092 A | 1/1998 | Schiflett | ....................... | 62/114 |
| 5,711,158 A | 1/1998 | Yoshida et al. | ................. | 62/77 |
| 5,722,256 A | 3/1998 | Schiflett | ....................... | 62/502 |
| 5,996,358 A * | 12/1999 | Sumida et al. | ................. | 62/129 |
| 6,018,952 A | 2/2000 | Tide et al. | ........................ | 62/77 |
| 6,187,219 B1 | 2/2001 | Omure et al. | .................. | 252/67 |
| 6,245,254 B1 | 6/2001 | Corr | ............................. | 252/68 |
| 6,247,320 B1 * | 6/2001 | Sumida et al. | ................. | 62/114 |

(Continued)

FOREIGN PATENT DOCUMENTS

EP     0 430 169 A1     11/1989

(Continued)

OTHER PUBLICATIONS

Abstract of Chinese Patent 1,196,378 published Oct. 21, 1998.
Abstract of Japanese Patent 8-041448, published Feb. 13, 1996.

*Primary Examiner*—John R Hardee
(74) *Attorney, Agent, or Firm*—Colleen D. Szuch

(57) ABSTRACT

A process for obtaining low temperature refrigeration in an existing or new low temperature refrigeration system designed to operate with, or suitable for use with, or capable of being used with HCFC-22 as the refrigerant, the refrigerant composition being a refrigerant composition comprising difluoromethane (HFC-32), pentafluoroethane (HFC-125) and tetrafluoroethane (HFC134a), the three components being present in the composition in amounts such that the operating characteristic of the refrigerant composition in regard to superheat is provided at an acceptable level and the operating characteristics of the refrigerant composition in regard to cooling capacity, mass flow and efficiency (COP) characteristics, when employed as the refrigerant in a low temperature refrigeration system, are each at least 95% of the operating characteristics of chlorodifluoromethane (HCFC-22) if HCFC-22 were to be employed as the refrigerant in such low temperature refrigeration system.

31 Claims, 1 Drawing Sheet

U.S. PATENT DOCUMENTS

| | | | |
|---|---|---|---|
| 6,293,108 B1 | 9/2001 | Cho et al. | 62/5 |
| 6,363,741 B2 | 4/2002 | Takemasa | 62/469 |
| 6,526,764 B1 | 3/2003 | Singh et al. | 62/84 |
| 6,606,868 B1 | 8/2003 | Powell et al. | 62/114 |
| 6,669,862 B1 | 12/2003 | Flowers | 252/67 |
| 2004/0061091 A1* | 4/2004 | Tieken | 252/67 |

FOREIGN PATENT DOCUMENTS

| | | |
|---|---|---|
| EP | 0 451 692 A2 | 10/1991 |
| EP | 0 509 673 A1 | 10/1992 |
| EP | 0 811 670 A1 | 12/1997 |
| EP | 772569 B1 | 9/2001 |
| EP | 1 193 305 A1 | 4/2002 |
| EP | 1205534 A1 | 7/2002 |
| EP | 1 295 534 A1 | 3/2003 |
| WO | WO01/23493 A1 | 4/2001 |
| WO | WO 2004/033582 | 4/2004 |
| WO | WO 2004/033582 A1 | 4/2004 |

* cited by examiner

REFRIGERANT COMPOSITIONS AND USE THEREOF IN LOW TEMPERATURE REFRIGERATION SYSTEMS

RELATED APPLICATION

This application claims priority from U.S. Provisional Application No. 60/488,042, filed Jul. 17, 2003.

FIELD OF THE INVENTION

This invention relates to refrigerant compositions for replacement of ozone-depleting refrigerant HCFC-22 for heating and cooling applications, especially in low temperature refrigerant systems, and to a process for retrofitting a low temperature refrigerant system containing HCFC-22 refrigerant with a refrigerant composition without the necessity for any significant modification of the refrigerant systems components or lubricants, yet still being able to obtain at least about 95% of the operating characteristics of the R-22 composition in such refrigerant systems. The invention also relates to a process for using such R-22 replacement refrigerant compositions in other systems capable of using R-22 refrigerant compositions such as newly designed systems.

BACKGROUND TO THE INVENTION

Mechanical refrigeration systems, and related heat transfer devices such as heat pumps and air conditioners, using refrigerant liquids are well known in the art for industrial, commercial and domestic uses. Chlorofluorocarbons (CFCs) were developed in the 1930s as refrigerants for such systems. However, since the 1980s the effect of CFCs on the stratospheric ozone layer has become the focus of much attention. In 1987 a number of governments signed the Montreal Protocol to protect the global environment setting forth a timetable for phasing out the CFC products. CFC's were replaced with more environmentally acceptable materials that contain hydrogen or hydrochlorofluorocarbons (HCFC's). Subsequent amendments to the Montreal protocol accelerated the phase-out of these CFCs and also scheduled the phase-out of HCFCs. Thus, there is a requirement for a non-flammable, non-toxic alternative to replace these CFCs and HCFCs. In response to such demand industry has developed a number of hydrofluorocarbons (HFCs), which have a zero ozone depletion potential.

The importance of refrigeration systems, especially low temperature refrigeration systems, to the food manufacture, distribution and retail industries is fundamental. Such systems play a vital role in ensuring that food which reaches the consumer is both fresh and fit to eat. In such low temperature refrigeration systems the popular refrigerant employed has been chlorodifluoromethane (R-22 or HCFC-22), which has an ozone-depleting potential and will be phased out completely.

A number of patent publications have suggested replacements for HCFC-22. That is, these patent publications have suggested refrigerants or refrigerant compositions that can be used instead of HCFC-22 in new refrigeration systems to be built or installed. Among such patent publications there may be mentioned U.S. Pat. No. 5,185,094, U.S. Pat. No. 5,370,811, U.S. Pat. No. 5,438,849, U.S. Pat. No. 5,643,492, U.S. Pat. No. 5,709,092, U.S. Pat. No. 5,722,256, U.S. Pat. No. 6,018,952, U.S. Pat. No. 6,187,219 B1, U.S. Pat. No. 6,606,868 B1, U.S. Pat. No. 6,669,862 B1, published US application NO. US 2004/00691091 A1, and published European application nos. EP 0 430169 A1, EP 0 509 673 A1 and EP 0 811 670 A1. While all the mentioned US patents and published EP applications disclose ternary mixtures of difluoromethane (HFC-32), pentafluoroethane (HFC-125) and tetrafluoroethane (HFC134a) for use in refrigeration or air conditioning systems, they do not address the ability to replace HCFC-22 in existing R-22 refrigeration systems or systems suitable for use with R-22 refrigerant, particularly in low temperature refrigeration systems, while obtaining at least about 95% of the operating characteristics of R-22 without the necessity for modification of the system, especially without the necessity for adjustment or replacement of the expansion valve of the low temperature refrigeration system. Comparative examples provided later in the present specification of this application show that tertiary compositions within the scope of the prior art disclosure are not suitable for use in low temperature R-22 refrigeration systems. Those prior art compositions do not obtain at least about 95% of the operating characteristics of R-22 so as to enable one to use such compositions in low temperature R-22 refrigeration systems over a wide range of low refrigeration temperatures and ambient temperatures without the necessity for modification of the system.

In order to retrofit an existing low temperature refrigeration system employing HCFC-22 refrigerant with replacement refrigerant, it is necessary that that the replacement refrigerant operating characteristics, such as evaporator superheat, cooling capacity, refrigerant mass flow rate, efficiency, pressure and energy consumption, are substantially identical to that of the HCFC-22 refrigerant being replaced. This near match in properties of the replacement refrigerant to those of HCFC-22 are essential for their use in such existing low temperature refrigeration systems or systems designed for using R-22 refrigerant, without requiring equipment replacement or modification, e.g. replacement or modification of expansion valves of the low temperature refrigeration system. The solutions suggested by the industry for R-22 replacements, such as R-407A and R-407C refrigerants, do not solve this problem since they require modification of the systems in an attempt to match R-22 operating characteristics.

SUMMARY OF THE INVENTION

It has been discovered that a ternary refrigerant compositions of about 25 to about 35, preferably about 30, mass percent difluoromethane (HFC-32), about 20 to about 40, preferably about 25 to about 35, and more preferably about 30 mass percent pentafluoroethane (HFC-125) and about 35 to about 45, preferably about 40, mass percent tetrafluoroethane (HFC134a), and especially a composition of about 30 mass percent HFC-32, about 30 mass percent HFC-125 and about 40 mass percent HFC134a are especially useful to retrofit existing low temperature refrigeration systems employing HCFC-22 refrigerant. The refrigerant compositions of this invention may also be employed in systems suitable for or capable of use with R-22 refrigerant such as existing, new or newly designed low temperature refrigeration systems. The ternary refrigerant compositions of this invention substantially match the operating characteristics of HCFC-22 refrigerant, especially in, desired evaporator superheat, cooling capacity, mass flow and efficiency, i.e., COP (coefficient of performance that is the ratio of refrigeration effect to the energy required) and thereby enable the ternary compositions of this invention to replace HCFC-22 in existing low temperature refrigeration systems or in refrigeration systems suitable for use with R-22 refrigerant, without requiring any significant system modification, such as adjustment, replacement or redesign of the R-22 system expansion valve. The values of the operating characteristics of the ternary compositions of this invention will generally be at least 95% or more, and preferably at least about 98% or more of the corresponding values of the operating characteristics of HCFC-22 in the low temperature refrigeration systems in which the ternary composition is to replace the HCFC-22 refrigerant. Also, the compositions employed in this invention are essentially non-flammable when tested in accordance with ASTM E681-2001 at conditions described in ASHRAE Standard 34 addendum P ($3^{rd}$ public review, January 1998).

In one aspect, the invention relates to a refrigerant composition comprising difluoromethane (HFC-32), pentafluoroethane (HFC-125) and tetrafluoroethane (HFC134a), the three components being present in the composition in amounts such that the operating characteristics of the refrigerant composition in regard to superheat provided during refrigeration is provided at an acceptable superheat level, and the operating characteristics of cooling capacity, mass flow characteristics and efficiency (COP), when employed as the refrigerant in a low temperature refrigeration system are each at least 95% and preferably 98% of the operating characteristics of chlorodifluoromethane (HCFC-22) if HCFC-22 were to be employed as the refrigerant in such low temperature refrigeration system.

In another aspect, this invention relates to a process for producing low temperature refrigeration in a low temperature refrigeration system suitable for use with HCFC-22 refrigerant, which system achieves and maintains an evaporator temperature of below 32° F. (0° C.), or about 14° F. (−10° C.) or below, or about 5° F. (−15° C.) or below, and even about −22° F. (−30° C.) or below, the process comprising condensing a refrigerant and thereafter evaporating the refrigerant with an evaporator in the vicinity of a body to be cooled, wherein the refrigerant composition comprises from about 25 to about 35 mass % difluoromethane (HFC-32), from about 20 to about 40 mass % pentafluoroethane (HFC-125), and from about 35 to about is 45 mass % tetrafluoroethane (HFC-134a) whereby these three components are present in the refrigerant composition such that the operating characteristic of evaporator superheat provided during refrigeration is in the range of from about 8° to about 16° F. (about 4.4 to about 8.9° C.) for an evaporation temperature range of about 15 to 30° F. (about −9 to −1° C.), in the range of from about 8° to about 12° F. (about 4.4° to about 6.7° C.) for an evaporation temperature of about −15° F. (about −26° C.), or in the range of from about 4° to about 8° F. (about 2.2° to about 4.4° C.) for an evaporation temperature of about −30° F. (about −34° C.), and the operating characteristics of the refrigerant composition in regard to cooling capacity, efficiency (COP), and mass flow, when employed as the refrigerant in the refrigeration system, are each at least about 95% of those operating characteristics if chlorodifluoromethane (HCFC-22) were to be employed as the refrigerant in said refrigeration system at identical refrigeration conditions. Another feature of the invention is such low temperature refrigeration systems comprising an evaporator and condenser and containing the refrigerant composition of this invention.

In a further aspect, this invention relates to a process for producing low temperature refrigeration in a low temperature refrigeration system that achieves and maintains an evaporator temperature of below 32° F. (0° C.) or about 14° F. (−10° C.) or below, or about 5° F. (−15° C.) or below, and even about −22° F. (−30° C.) or below and has chlorodifluoromethane (HCFC-22) as a refrigerant therein, the process comprising replacing, and preferably essentially totally replacing, the chlorodifluoromethane (HCFC-22) refrigerant in the refrigeration system with a replacement refrigerant composition comprising the three components: difluoromethane (HFC-32), pentafluoroethane (HFC-125), and tetrafluoroethane (HFC-134a), condensing the replacement refrigerant composition and thereafter evaporating the replacement refrigerant composition with an evaporator in the vicinity of a body to be cooled, wherein the refrigerant composition comprises from about 25 to about 35 mass % difluoromethane (HFC-32), from about 20 to about 40 mass % pentafluoroethane (HFC-125), and from about 35 to about 45 mass % tetrafluoroethane (HFC-134a) whereby these three components are present in the refrigerant composition such that the operating characteristic of superheat provided during refrigeration is in the range of from about 8° to about 16° F. (about 4.4 to about 8.9° C.) for an evaporation temperature range of about 15 to 30° F. (about −9 to −1° C.), in the range of from about 8° to about 12° F. (about 4.4° to about 6.7° C.) for an evaporation temperature of about −15° F. (about −26° C.), or in the range of from about 4° to about 8° F. (about 2.2° to about 4.4° C.) for an evaporation temperature of about −30° F. (about −34° C.), and the operating characteristics of the refrigerant composition in regard to cooling capacity, efficiency (COP), and mass flow, when employed as the refrigerant in the refrigeration system, are each at least about 95% of those operating characteristics if chlorodifluoromethane (HCFC-22) were to be employed as the refrigerant in said refrigeration system at identical refrigeration conditions. "Essentially totally replacing" means that some slight amount, generally less than about 5%, preferably less than about 3%, and more preferably less than about 1%, of HCFC may inadvertently remain in the system upon the replacement.

A still further aspect of this invention is in providing a process for producing low temperature refrigeration in a new low temperature refrigeration system suitable to be used with chlorodifluoromethane (HCFC-22) that achieves and maintains a temperature of below 32° F. (0° C.) or about 14° F. (−10° C.) or below, or about 5° F. (−15° C.) or below, and even about −22° F. (−30° C.) or below and designed to be operated with chlorodifluoromethane (HCFC-22) as a refrigerant therein, the process comprising condensing a refrigerant composition and thereafter evaporating the refrigerant composition with an evaporator in the vicinity of a body to be cooled, wherein the refrigerant composition comprises from about 25 to about 35 mass % difluoromethane (HFC-32), from about 20 to about 40 mass % pentafluoroethane (HFC-125), and from about 35 to about 45 mass % tetrafluoroethane (HFC-134a) whereby these three components are present in the refrigerant composition such that the operating characteristic of superheat provided during refrigeration is in the range of from about 8° to about 16° F. (about 4.4 to about 8.9° C.) for an evaporation temperature range of about 15 to 30° F. (about −9° to −1° C.), in the range of from about 8° to about 12° F. (about 4.4° to about 6.7° C.) for an evaporation a temperature of about −15° F. (about ±26° C.), or in the range of from about 4° to about 8° F. (about 2.2° to about 4.4° C.) for an evaporation temperature of about −30° F. (about −34° C.), and the operating characteristics of the refrigerant composition in regard to cooling capacity, efficiency (COP), and mass flow, when employed as the refrigerant in the refrigeration system, are each at least about 95% of those operating characteristics if chlorodifluoromethane (HCFC-22) were to be employed as the refrigerant in said refrigeration system at identical refrigeration conditions. The phrase "suitable to be used with chlorodifluoromethane (HCFC-22)" means a system has used, or can, or is capable of using chlorodifluoromethane (HCFC-22) refrigerant in the system to obtain the low temperature refrigeration.

A yet another aspect of this invention is to provide the refrigeration processes described wherein there is no necessity for adjustment (including redesign) or replacement of any chlorodifluoromethane (HCFC-22) system expansion valve of the low temperature refrigeration system in order to obtain the stated operating characteristic. Still further aspects of the invention relate to such refrigeration processes wherein the low temperature refrigeration achieves and maintains a temperature of about 14° F. (−10° C.) or below, or of about 5° F. (−15° C.) or below, and also a temperature of about −22° F. (−30° C.) or below.

Although the refrigerant compositions of this invention have been formulated to be useful to replace HCFC-22 refrigerant in existing low temperature refrigeration systems and other low temperature refrigeration systems suitable for using chlorodifluoromethane (HCFC-22) refrigerant, it will be appreciated that use of such refrigerant compositions of this invention is not limited to such use but will have other refrigerant uses, such as, for example, in non-low temperature refrigeration systems.

DETAILED DESCRIPTION OF THE INVENTION

Figure 1:
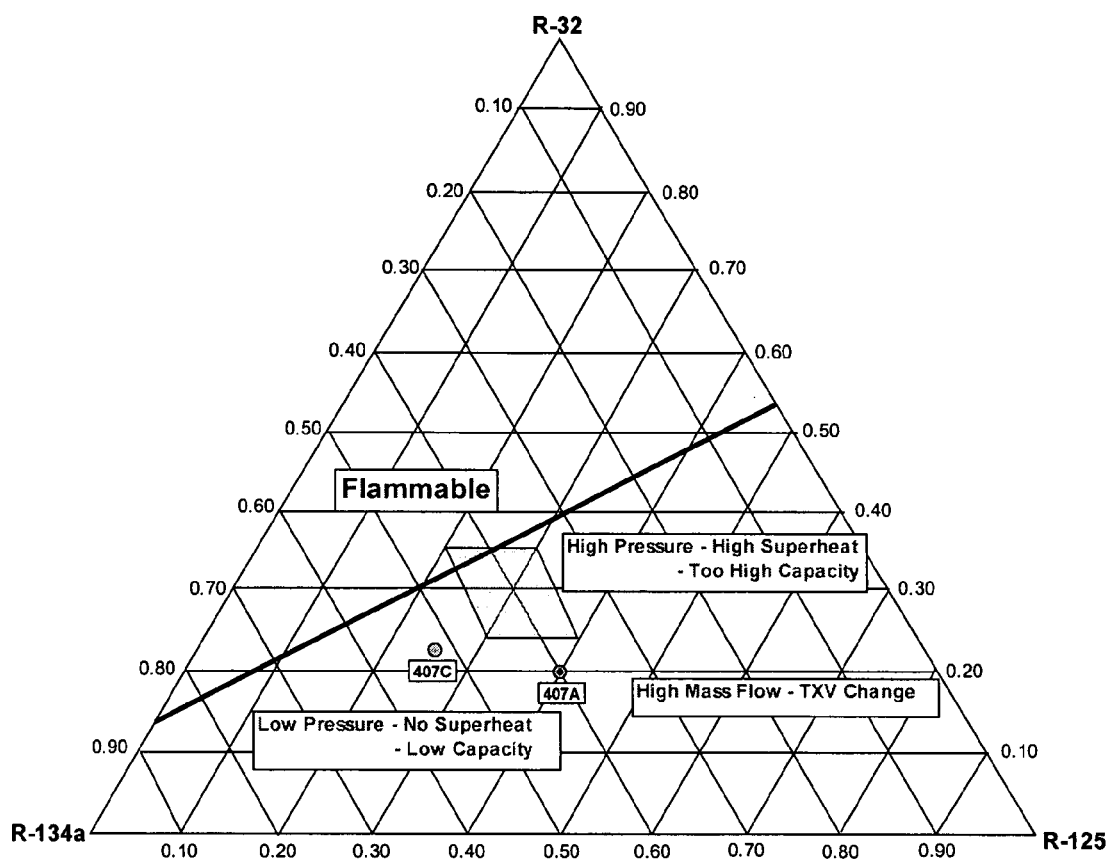
FIG. 1 is a graph of the refrigerant compositions of this invention outlining the proportions of the tertiary composition components, and showing their close proportional relationship to two comparative refrigerant compositions examples outside the scope of the invention that were tested in a low temperature refrigeration system and shown not to provide at least about 95% of the operating characteristics of R-22 over a wide range of low temperature operating temperatures without the necessity for modification of the system.

It has been discovered that specific ternary refrigerant compositions can be utilized in a process for producing low temperature refrigeration in a low temperature refrigeration system suitable for use with HCFC-22 refrigerant, which system achieves and maintains an evaporator temperature of below 32° F. (0° C.), or about 14° F. (−10° C.) or below, or about 5° F. (−15° C.) or below, and even about −22° F. (−30° C.) or below, the process comprising condensing a refrigerant and thereafter evaporating the refrigerant with an evaporator in the vicinity of a body to be cooled, wherein the refrigerant composition comprises from about 25 to about 35 mass % difluoromethane (HFC-32), from about 20 to about 40 mass % pentafluoroethane (HFC-125), and from about 35 to about 45 mass % tetrafluoroethane (HFC-134a) whereby these three components are present in the refrigerant composition such that the operating characteristic of superheat provided during refrigeration is in the range of from about 8° to about 16° F. (about 4.4 to about 8.9° C.) for an evaporator temperature range of about 15 to 30° F. (about −9° to −1° C.), in the range of from about 8° to about 12° F. (about 4.4° to about 6.7° C.) for an evaporator temperature of about −15° F. (about −26° C.), or in the range of from about 4° to about 8° F. (about 2.2° to about 4.4° C.) for an evaporator temperature of about −30° F. (about −34° C.), and the operating characteristics of the refrigerant composition in regard to cooling capacity, is efficiency (COP), and mass flow, when employed as the refrigerant in the refrigeration system, are each at least about 95% of those operating characteristics if chlorodifluoromethane (HCFC-22) were employed as the refrigerant in said refrigeration system at identical refrigeration conditions.

The phrase "low temperature refrigeration system" means a refrigeration system that achieves and maintains an evaporator temperature of below 32° F. (−0° C.), preferably about 14° F. (−10° C.) or below, and more particularly about 5° F. (−15° C.) or below, and especially a temperature of about −22° F. (−30° C.) or below.

The term "superheat" means the temperature rise of the refrigerant at the exit of the evaporator above the saturated vapor temperature (or dew temperature) of the refrigerant.

The term "COP" is a measure of energy efficiency and means the ratio of refrigeration or cooling capacity to the energy requirement of the refrigeration system, i.e., energy to run the compressor.

The term "mass flow rate" means to the amount (pounds) of refrigerant flowing through a conduit of a given size in a given amount of time.

The term "capacity" refers to the amount of cooling provided, in BTUs/hr, by the refrigerant in the refrigeration system. This is experimentally determined by multiplying the change in enthalpy, in Btu/lb, of the refrigerant as it passes through the evaporator by the mass flow rate of the refrigerant. The enthalpy can be determined from a measurement of the pressure and temperature of the refrigerant.

Refrigerant compositions that do not meet both the evaporator superheat requirements and have values for their operating characteristics, such as capacity, COP and mass flow rate, in low temperature refrigeration systems that will be at least 95% of the corresponding values of the operating characteristics of HCFC-22 in an identical low temperature refrigeration system are not suitable for use in replacing HCFC-22 refrigerant in such low temperature refrigeration systems since the use of such compositions will generally require modification or replacement or redesign of the HCFC-22 refrigeration system components, such as expansion valve used in HCFC-22 refrigeration systems, and thus lead to undesired expense and downtime for the systems. In contrast, the ternary refrigerant compositions of this invention do have the ability to substantially match evaporator superheat requirements and meet at least 95% or more of the value of, operating characteristics (such as, cooling capacity, efficiency and mass flow), of HCFC-22 in low temperature refrigeration systems across a wide range of refrigeration conditions, e.g., evaporator and ambient temperatures, The surprising ability of the ternary refrigerant compositions of this invention to substantially match operating characteristics of HCHC-22 in low temperature refrigeration systems across a wide range of refrigeration conditions, e.g., evaporator and ambient temperatures, and the inability of the compositions within the scope of the prior art and other comparative compositions to substantially match such operating characteristics of HCFC-22 in such systems is illustrated by the following non-limiting, examples.

Ternary compositions in accordance with this invention were prepared by producing mixtures of the refrigerants HFC-32, HFC-125 and HFC-134a in the amounts indicated in the following Table 1. The compositions were subjected to thermodynamic analysis to determine their ability to match the operating characteristics of HCFC-22 (R-22) in a low temperature refrigeration system. This analysis was performed using properties from the National Institute of Science and Technology (NIST) Reference Fluid Thermodynamic and Transport Properties Database (Refprop 7.0, NIST Std. Database, 2002). The assumptions used to is conduct the analysis are the following. All calculations were performed assuming an average evaporation temperature of −25° F. (−31.7° C.) and 25° F. (13.9° C.) total super heat including 10° F. (5.5° C.) useful (in evaporator). Average condensing temperature is equal to ambient temperature plus 15° F. (8.3° C.). Capacity is based on 1 cu. ft./min (0.028 m$^3$/min) compressor displacement. COP assumes 65% isentropic compressor efficiency.

The results of the performance prediction for the compositions of this invention relative to HCFC-22 (R-22) are set forth in the following Table 1.

TABLE 1

| Composition components (mass percent) | Ambient temperature °F. (°C.) | Capacity Btu/hr (watts) Value | Capacity Btu/hr (watts) % Relative to HCFC-22 value | Mass Flow lb/min (kg/min) Value | Mass Flow lb/min (kg/min) % Relative to HCFC-22 value | COP Value | COP % Relative to HCFC-22 value |
|---|---|---|---|---|---|---|---|
| HCFC-22 | 60° (15.5°) | 1771 (519) | N/A | 0.404 (.184) | N/A | 2.08 | N/A |
|  | 80° (26.6°) | 1662 (487) | N/A | 0.404 (.184) | N/A | 1.74 | N/A |
|  | 95° (35°) | 1550 (454) | N/A | 0.404 (.184) | N/A | 1.46 | N/A |
| HFC-32 (30%) | 60° (15.5°) | 1837 (538) | 103.7% | 0.419 (.190) | 103.7% | 1.97 | 94.7% |
| HFC-125 (30%) | 80° (26.6°) | 1662 (494) | 101.4% | 0.416 (.189) | 103.0% | 1.62 | 93.1% |
| HFC-134a (40%) | 95° (35°) | 1529 (448) | 98.6% | 0.413 (.188) | 102.2% | 1.34 | 91.8% |
| HFC-32 (25%) | 60° (15.5°) | 1776 (520) | 100.3% | 0.427 (.194) | 105.7% | 1.96 | 94.2% |
| HFC-125 (35%) | 80° (26.6°) | 1623 (476) | 97.7% | 0.424 (.193) | 105.0% | 1.61 | 92.5% |
| HFC-134a (40%) | 95° (35°) | 1466 (430) | 94.6% | 0.420 (.191) | 104.0% | 1.33 | 91.1% |

The substantially identical match of the operating characteristics of the ternary refrigerant compositions of this invention to that of HCFC-22 demonstrates that such ternary compositions can be used to retrofit existing low temperature HCFC-22 refrigerant-containing refrigeration systems without any significant modification to the refrigeration system components. This match also demonstrates that the compositions of this invention can be used in any low temperature refrigeration system suitable for use with HCFC-22.

A ternary composition in accordance with this invention, as well as two comparative compositions in accordance with the disclosure in prior art publication EP 0 5 09 6 73 A1, comprising mixtures of the refrigerants HFC-32, HFC-125 and HFC-134a in the amounts indicated in the following Table 2, were subjected to thermodynamic analysis to determine their ability to substantially match the operating characteristics of HCFC-22 in a low temperature refrigeration system operating at −25° F. (−31.7° C.) evaporation temperature and 110° F. (43° C.) condensing temperature. This analysis was performed using properties from the National Institute of Science and Technology (NIST) Reference Fluid Thermodynamic and Transport Properties Database (Refprop 7.0, NIST Std. Database, 2002). The assumptions used to conduct the analysis are the following. All calculations were performed assuming an average evaporation temperature of −25° F. (−31.7° C., and 25° F. (13.9° C.) total super heat at the compressor which includes 10° F. (5.5° C.) useful in the evaporator. Average condensing temperature is equal to ambient temperature plus 15° F. (8.3° C.). Capacity is based on 1 cu. ft./min ((0.028 m³/min) compressor displacement. COP assumes 65% isentropic compressor efficiency.

The results of the thermodynamic analysis are reported in Table 2.

TABLE 2

| Composition components (wt percent) | Capacity Btu/hr (watts) Value % | Capacity Btu/hr (watts) % Relative to HCFC-22 value | lb/min lb/min (kg/min) Value | lb/min lb/min (kg/min) % Relative to HCFC-22 value |
|---|---|---|---|---|
| HCFC-22 (100%) | 1550 (454) |  | 0.404 (.184) |  |
| HFC-32 (35%) HFC-125 (10%) HFC-134a (55%) Comparative composition | 1458 (427) | 94.1% | 0.350 (.159) | 86.7% |
| HFC-32 (30%) HFC-125 (15%) HFC-134a (55%) Comparative composition | 1402 (411) | 90.5% | 0.355 (.161) | 88.0% |
| HFC-32 (30%) HFC-125 (30%) HFC-134a (40%) Inventive composition | 1529 (448) | 98.6% | 0.413 (.188) | 102.2% |

As can be seen from the data above, for the comparative compositions of the prior art, their operating characteristics are not substantially identical to the operating characteristic of HCFC-22 in capacity and mass flow and therefore are not considered suitable to replace HCFC-22 refrigerant in existing low temperature refrigeration systems without the need to change other components of the refrigeration system. In contrast thereto, the data for the compositions of this invention are substantially identical to the operating characteristics of the HCFC-22 refrigerant and, therefore, are suitable to replace HCFC-22 refrigerant in existing low temperature refrigeration systems without the need to change components of the refrigeration system. This match also demonstrates that the compositions of this invention can be used in any low temperature refrigeration system suitable for use with HCFC-22.

The criticality of the proportions of the components of the ternary composition of the present invention is demonstrated by the following comparative testing. The comparative testing, in relationship to an HCFC-22 (R-22) composition, is comparative testing of three ternary compositions of this invention (designated compositions LT, LT1 and LT2) with two closely related prior art ternary compositions (designated R-407A and R-407C) having proportions of the three components outside the ranges of the component proportions of this invention. The compositions are further identified in Table 3.

Comparison in a Typical Commercial Refrigeration System

The compositions were tested with the refrigerant the system was designed for, HCFC-22, to serve as a baseline for subsequent tests. All three inventive compositions performed nearly identical to that of the baseline HCFC-22 (R-22). There was no need to adjust the expansion valve much less replace it. Refrigerant mass flow rate, cooling capacity, and efficiency (COP) matched that of HCFC-22 within expected measurement error. Other refrigerants R-407A and R-407C did not perform adequately. Using these comparative refrigerants would require change of system components such as the expansion valve and possibly the evaporator.

The commercial refrigeration system equipment employed was a commercially available condensing unit and an evaporator for a walk-in freezer/cooler. The following is a detailed description of the equipment:

Condensing Unit

Unit as manufactured by Keeprite Refrigeration, Brantford, Ontario Model K350L2 outdoor, air cooled, low temperature, R-22 condensing unit equipped with:

460 volts/60 Hz./3 phase electrical,

2DF-0300 Copeland compressor, with demand cooling for low temperature conditions and KAKA-020 Copeland compressor for higher temperature conditions suction accumulator, oil separator with solenoid, receiver, two valve flooded head pressure control system, and standard operating controls.

Evaporator

Unit as manufactured by Keeprite Refrigeration.

Model KUCB204DED electric defrost, low profile DX fed evaporator with:

230 volts/60 Hz./1 phase electrical, electric defrost heaters, 17,340 BTUH @ −20 deg. F. SST, 10 degree TD, 3,200 CFM air flow, and Sporlan distributor and TXV.

The evaporator was installed in an environmentally controlled chamber that served as the walk-in freezer/cooler. The condenser unit was installed in another chamber to control temperature. Instrumentation was added to the system to measure refrigerant mass flow rate, refrigerant pressure & temperature before and after each component, air temperature and flow in/out of evaporator and condenser, and power to condensing unit and evaporator. Tests were run at two typical freezer temperatures (0° F. and −15° F.), two typical walk-in cooler temperatures (35° F. and 50° F.) and a range of ambient temperatures from 55° F. to 95° F. It should be noted that the refrigerant temperatures were typically 15 to 20° F. lower than the chamber temperatures.

The tested compositions were as follows.

TABLE 3

| Commercial Name or Designation | Refrigerants Tested % by weight | | |
|---|---|---|---|
| | R-32 | R-125 | R-134a |
| LT | 30 | 30 | 40 |
| LT1 | 25 | 35 | 40 |
| LT2 | 35 | 25 | 40 |
| R-407A | 20 | 40 | 40 |
| R-407C | 23 | 25 | 52 |

R-404a is composed of 44 wt % HFC-125, 52 wt % HFC-143A and 4 wt % HEC-134a. It is a common low temperature refrigerant.

The results of the series of tests are shown in Tables 4 through 7. Table 4 lists the superheat at the exit of the evaporator. In order for the system to operate reliably and efficiently, superheat should be in the 8 to 16° F. (4.4 to 8.9° C.) range for moderate temperatures (e.g. 35° F. and 50° F. Cooler Temp.), 8 to 12° F. (4.4 to 6.7° C.) range for moderately low temperatures (e.g. 0° F. Freezer Temp.) and 4 to 8° F. (2.2 to 4.4° C.) range for very low temperatures (e.g. −15° F. Freezer Temp.) (Ref: Sporlan Valve Company, Expansion Valve Bulletin). If the superheat is too low or negative, the refrigerant is in the two-phase region (liquid and vapor) and liquid refrigerant can be leaving the evaporator and potentially cause damage to the compressor. If the superheat is too high, the capacity and efficiency of the system suffers and could also cause reliability problems due to high compressor discharge temperatures.

TABLE 4

| | | | | | | | Evaporator Superheat (° F.) | | | | | |
|---|---|---|---|---|---|---|---|---|---|---|---|---|
| | | | | | | | Refrigerant | | | | | |
| Chamber Temp. | Approx. Evap. Temp. | Outdoor Temp. | R-22 | LT | LT1 | LT2 | R-407A | | R-407C | | R-404A | |
| | | | | | | | No Adj. | Adj TXV | No Adj. | Adj TXV | No Adj. | Adj TXV |
| −15° F. | −30° F. | 55° F. | 6.78 | 7.39 | 6.99 | 5.06 | 2.18 | — | −0.51 | — | 19.43 | — |
| | | 75° F. | 6.80 | 4.42 | 6.32 | 5.63 | 0.20 | — | −1.53 | — | 17.30 | — |
| | | 95° F. | 4.94 | 2.92 | 1.90 | 5.06 | −0.50 | 4.90 | −1.25 | — | 15.48 | — |
| 0° F. | −20° F. | 55° F. | 11.44 | 11.57 | 11.56 | 10.49 | 7.76 | — | 5.88 | | 25.04 | — |
| | | 75° F. | 11.99 | 11.05 | 9.70 | 11.22 | 8.67 | — | 4.84 | 10.50 | 24.32 | — |
| | | 95° F. | 9.95 | 8.97 | 9.14 | 11.48 | 7.48 | 10.00 | 4.15 | 8.50 | 21.52 | 12.50 |
| 35° F. | 15° F. | 55° F. | 11.66 | 13.78 | 12.21 | 14.55 | 11.39 | — | 6.88 | — | 23.36 | — |
| | | 80° F. | 10.78 | 11.54 | 10.93 | 12.59 | 10.12 | — | 6.52 | — | 21.48 | — |
| | | 95° F. | 9.08 | 10.39 | 10.01 | 11.78 | 9.11 | — | 5.5S | — | 19.78 | 9.77 |

TABLE 4-continued

Evaporator Superheat (° F.)

| Chamber Temp. | Approx. Evap. Temp. | Outdoor Temp. | R-22 | LT | LT1 | LT2 | R-407A | | R-407C | | R-404A | |
|---|---|---|---|---|---|---|---|---|---|---|---|---|
| | | | | | | | No Adj. | Adj TXV | No Adj. | Adj TXV | No Adj. | Adj TXV |
| 50° F. | 30° F. | 55° F. | 12.06 | 16.85 | 15.08 | 16.58 | 14.93 | — | 9.53 | — | 27.11 | — |
| | | 80° F. | 12.13 | 13.09 | 13.11 | 14.89 | 12.16 | — | 8.65 | — | 23.86 | — |
| | | 95° F. | 10.43 | 11.86 | 12.00 | 13.52 | 10.69 | — | 7.41 | — | 21.89 | — |

From the results, it is clear that for refrigerants R-407A, R-407C, and R-404A, the expansion valve needs to be either adjusted or changed. R-407A and R-407C allows liquid to leave the evaporator at low temperature (noted by negative superheat numbers). R-404A has too high a superheat, which leads to poor cooling performance.

The refrigerant mass flow, cooling capacity, and efficiency (COP) are shown relative to R-22 in the following three tables. LT, LT1, and LT2 consistently show performance comparable to that of the refrigerant the system was designed to operate with, R-22. This is especially true for the LT blend at the highest ambient temperature for both 0° F. and −15° F. freezer temperatures, where the match with the mass flow and capacity with R-22 is most critical (design point of the system). LT1 and LT2 also show acceptable performance considering that no adjustment or change of the expansion valve is needed.

TABLE 5

Refrigerant Mass Flow Relative to R-22

| Chamber Temperature | Approx. Evap. Temp. | Outdoor Temperature | LT | LT1 | LT2 | R-407A | | R-407C | | R-404A | |
|---|---|---|---|---|---|---|---|---|---|---|---|
| | | | | | | No Adj. | Adj TXV | No Adj. | Adj TXV | No Adj. | Adj TXV |
| −15° F. | −30° F. | 55° F. | 99% | 98% | 97% | 111% | — | 98% | — | 122% | — |
| | | 75° F. | 101% | 98% | 97% | 110% | — | 101% | — | 121% | — |
| | | 95° F. | 101% | 96% | 100% | 115% | 90% | 97% | — | 124% | — |
| 0° F. | −20° F. | 55° F. | 95% | 100% | 94% | 103% | — | 95% | — | 112% | — |
| | | 75° F. | 100% | 102% | 88% | 105% | — | 94% | 86% | 115% | — |
| | | 95° F. | 101% | 103% | 93% | 108% | 92% | 97% | 90% | 121% | 145% |
| 35° F. | 15° F. | 55° F. | 98% | 100% | 93% | 106% | — | 100% | — | 114% | — |
| | | 80° F. | 98% | 99% | 91% | 104% | — | 98% | — | 113% | — |
| | | 95° F. | 97% | 97% | 90% | 104% | — | 97% | — | 110% | 135% |
| 50° F. | 30° F. | 55° F. | 97% | 99% | 89% | 104% | — | 99% | — | 109% | — |
| | | 80° F. | 99% | 101% | 90% | 107% | — | 99% | — | 111% | — |
| | | 95° F. | 98% | 100% | 90% | 107% | — | 98% | — | 113% | — |
| Average of All Conditions | | | 99% | 99% | 93% | 107% | 91% | 98% | 88% | 115% | 140% |

TABLE 6

Refrigeration Capacity Relative to R-22

| Chamber Temperature | Approx. Evap. Temp. | Outdoor Temperature | LT | LT1 | LT2 | R-407A | | R-407C | | R-404A | |
|---|---|---|---|---|---|---|---|---|---|---|---|
| | | | | | | No Adj. | Adj TXV | No Adj. | Adj TXV | No Adj. | Adj TXV |
| −15° F. | −30° F. | 55° F. | 99% | 90% | 97% | 95% | — | 91% | — | 88% | — |
| | | 75° F. | 103% | 94% | 104% | 98% | — | 99% | — | 87% | — |
| | | 95° F. | 99% | 89% | 104% | 99% | 80% | 93% | — | 83% | — |
| 0° F. | −20° F. | 55° F. | 99% | 96% | 100% | 92% | — | 94% | — | 82% | — |
| | | 75° F. | 101% | 96% | 93% | 94% | — | 91% | 85% | 83% | — |
| | | 95° F. | 99% | 95% | 97% | 93% | 80% | 92% | 88% | 81% | 91% |
| 35° F. | 15° F. | 55° F. | 104% | 99% | 103% | 100% | — | 101% | — | 90% | — |
| | | 80° F. | 99% | 95% | 97% | 95% | — | 97% | — | 84% | — |
| | | 95° F. | 97% | 92% | 95% | 93% | — | 94% | — | 78% | 92% |
| 50° F. | 30° F. | 55° F. | 104% | 100% | 100% | 100% | — | 100% | — | 89% | — |
| | | 80° F. | 99% | 97% | 96% | 97% | — | 97% | — | 83% | — |
| | | 95° F. | 98% | 96% | 95% | 96% | — | 97% | — | 81% | — |
| Average of All Conditions | | | 100% | 96% | 97% | 96% | 80% | 96% | 87% | 84% | 92% |

TABLE 7

COP (Efficiency) Relative to R-22

| Chamber Temperature | Approx. Evap. Temp. | Outdoor Temperature | LT | LT1 | LT2 | R-407A No Adj. | R-407A Adj TXV | R-407C No Adj. | R-407C Adj TXV | R-404A No Adj. | R-404A Adj TXV |
|---|---|---|---|---|---|---|---|---|---|---|---|
| −15° F. | −30° F. | 55° F. | 99% | 94% | 94% | 95% | — | 95% | — | 90% | — |
|  |  | 75° F. | 101% | 97% | 101% | 99% | — | 102% | — | 86% | — |
|  |  | 95° F. | 98% | 94% | 101% | 99% | 89% | 100% | — | 84% | — |
| 0° F. | −20° F. | 55° F. | 100% | 98% | 98% | 92% | — | 99% | — | 83% | — |
|  |  | 75° F. | 100% | 95% | 92% | 94% | — | 95% | 92% | 83% | — |
|  |  | 95° F. | 94% | 95% | 93% | 93% | 85% | 96% | 93% | 80% | 83% |
| 35° F. | 15° F. | 55° F. | 106% | 103% | 105% | 104% | — | 105% | — | 94% | — |
|  |  | 80° F. | 98% | 98% | 96% | 98% | — | 101% | — | 87% | — |
|  |  | 95° F. | 92% | 91% | 91% | 92% | — | 95% | — | 78% | 87% |
| 50° F. | 30° F. | 55° F. | 105% | 102% | 102% | 103% | — | 103% | — | 91% | — |
|  |  | 80° F. | 95% | 94% | 91% | 95% | — | 98% | — | 81% | — |
|  |  | 95° F. | 93% | 93% | 90% | 93% | — | 96% | — | 80% | — |
| Average of All Conditions |  |  | 98% | 96% | 96% | 97% | 87% | 99% | 92% | 85% | 85% |

TABLE 8

Expansion Valve Adjustments Impact on Performance
Condition means Chamber/outdoor temperature

| Refrigerant | Condition | Superheat | Mass Flow | Capacity | COP |
|---|---|---|---|---|---|
| R-404A | 0° F./95° F. | 12.5 | 354.6 / 145% | 14846 / 91% | 0.96 / 83% |
| R-404A | 35° F./95° F. | 9.8 | 253.2 / 135% | 12198 / 92% | 1.38 / 87% |
| R-407C | 0° F./95° F. | 8.5 | 221.4 / 90% | 14215 / 88% | 1.08 / 93% |
| R-407C | 0° F./75° F. | 10.5 | 213.8 / 86% | 15087 / 85% | 1.22 / 92% |
| R-407A | −15° F./95° F. | 4.9 | 153.0 / 90% | 9047 / 80% | 0.82 / 89% |
| R-407A | 0° F./95° F. | 10.0 | 225.0 / 92% | 13000 / 80% | 0.99 / 85% |

R-407A and R-407C's performance at first glance looks acceptable but the R-22 expansion valve fails to operate satisfactorily over the operating range thereby not providing the required superheat (rise in temperature) without modification of the refrigeration system. This necessitates, at a minimum, an adjustment of this expansion valve component to increase the superheat. The "Adj TXV" columns and Table 8 shows the performance impact of such an adjustment. Capacity and COP are affected resulting in significantly lower performance than R-22 and the LT blends. R-407C's capacity drops to only 88% of R-22's at the critical design point. Likewise R-407A has significantly lower capacity. R-404A's original performance showed too great a superheat so the expansion valve was adjusted to lower the superheat. The performance improved but still remained considerably below that of R-22 and the LT blends. It should be noted that the adjusted TXV data for R-407A at 0° F./95° F. was extrapolated from actual test data at lower superheats (5.2 to 6.6° F.).

FIG. 1 shows the range of the components of the ternary compositions of this invention in the diamond shaped area in the graph and illustrates reasons why this range has considerable advantages over compositions outside this range designated by the dots for R-407A and R-407C. Moving up the graph from the diamond shaped area of the invention results in too great an R-32 concentration and can result in high pressures, high superheat, and flammability issues. Moving down and to the left of the diamond shaped area of the invention in the graph results in low pressures, low capacity, and lack of superheat heat using expansion valves designed for R-22. Moving to the right of the diamond shaped area of the invention in the graph results in higher mass flows and higher pressure and the necessity to replace the expansion valve with a new one designed for these conditions. The graph also illustrates the nearby prior art compositions (R-407 A and R-407C) that do not produce the required nearly identical match with the operating characteristics of R-22 that the compositions of this invention produce.

While the invention has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

I claim:

1. A process for producing low temperature refrigeration in a low temperature refrigeration system suitable for use with chlorodifluoromethane (R-22) refrigerant that achieves and maintains an evaporator temperature of below 32° F. (0° C.), the process comprising condensing a refrigerant and thereafter evaporating the refrigerant in the vicinity of a body to be cooled, wherein the refrigerant composition comprises from about 25 to about 30 mass % difluoromethane (R-32), from about 30 to about 35 mass % pentafluoroethane (R-125), and 40 mass % tetrafluoroethane (R-134a) whereby these three components are present in the refrigerant composition such that the operating characteristic of positive superheat provided during refrigeration is in the range of from about 8° to about 16° F. for an evaporation temperature range of about 15° to 30° F., in the range of from about 8° to about 12° F. for an evaporation temperature of about −15° F., and in the range of from about 4° to about 8° F. for an evaporation temperature of about −30° F., and wherein the operating characteristics of the refrigerant composition in regard to cooling capacity, efficiency (COP), and mass flow, when employed as the refrigerant in the refrigeration system, are each at least about 95% of those operating characteristics if chlorodifluoromethane (R-22) were to be employed as the refrigerant in said refrigeration system at identical refrigeration conditions.

2. A process for producing low temperature refrigeration in a low temperature refrigeration system suitable for use with chlorodifluoromethane (R-22) refrigerant according to claim 1 wherein the refrigeration achieves and maintains an evaporator temperature of about 14° F. or below.

3. A process for producing low temperature refrigeration according to claim 2 wherein the refrigeration system is a new low temperature refrigeration system suitable for use with chlorodifluoromethane (R-22) refrigerant.

4. A process for producing low temperature refrigeration in a low temperature refrigeration system suitable for use with chlorodifluoromethane (R-22) refrigerant according to claim 1 wherein the refrigeration achieves and maintains an evaporator temperature of about 5° F. or below.

5. A process for producing low temperature refrigeration according to claim 4 wherein the refrigeration system is a new low temperature refrigeration system suitable for use with chlorodifluoromethane (R-22) refrigerant.

6. A process for producing low temperature refrigeration in a low temperature refrigeration system suitable for use with chlorodifluoromethane (R-22) refrigerant according to claim 1 wherein the refrigeration achieves and maintains an evaporator temperature of about −22° F. or below.

7. A process for producing low temperature refrigeration according to claim 6 wherein the refrigeration system is a new low temperature refrigeration system suitable for use with chlorodifluoromethane (R-22) refrigerant.

8. A process for producing low temperature refrigeration in a low temperature refrigeration system according to claim 1 wherein the refrigeration achieves and maintains an evaporator temperature of about −22° F. or below.

9. A process for producing low temperature refrigeration in a low temperature refrigeration system according to claim 8, the process comprising essentially totally replacing the chlorodifluoromethane (R-22) refrigerant in the refrigeration system with the replacement refrigerant composition.

10. A process for producing low temperature refrigeration according to claim 1 wherein the refrigeration system is a new low temperature refrigeration system suitable for use with chlorodifluoromethane (R-22) refrigerant.

11. A process for producing low temperature refrigeration in a low temperature refrigeration system according to claim 10, wherein the refrigerant composition comprises about 30 mass % difluoromethane (R-32), about 30 mass % pentafluoroethane (R-125), and about 40 mass % tetrafluoroethane (R-134a).

12. A process for producing low temperature refrigeration in a low temperature refrigeration system according to claim 10 wherein the process requires no adjustment or replacement of any expansion valve of the low temperature refrigeration system to obtain the said operating results.

13. A process for producing low temperature refrigeration in a low temperature refrigeration system according to claim 12, wherein the refrigerant composition comprises about 30 mass % difluoromethane (R-32), about 30 mass % pentafluoroethane (R-125), and about 40 mass % tetrafluoroethane (R-134a).

14. A process for producing low temperature refrigeration in a low temperature refrigeration system according to claim 1 wherein the process requires no adjustment or replacement of any expansion valve of the low temperature refrigeration system to obtain the said operating results.

15. A process for producing low temperature refrigeration in a low temperature refrigeration system according to claim 14, wherein the refrigerant composition comprises about 30 mass % difluoromethane (R-32), about 30 mass % pentafluoroethane (R-125), and about 40 mass % tetrafluoroethane (R-134a).

16. A process for producing low temperature refrigeration in a low temperature refrigeration system according to claim 1, wherein the refrigerant composition comprises about 30 mass % difluoromethane (R-32), about 30 mass % pentafluoroethane (R-125), and about 40 mass % tetrafluoroethane (R-134a).

17. A process for producing low temperature refrigeration in a low temperature refrigeration system that achieves and maintains an evaporator temperature of below 32° F. (0° C.) and has chlorodifluoromethane (R-22) as a refrigerant therein, the process comprising replacing the chlorodifluoromethane (R-22) refrigerant in the refrigeration system with a replacement refrigerant composition comprising the three components: difluoromethane (R-32), pentafluoroethane (R-125), and tetrafluoroethane (R-134a), condensing the replacement refrigerant composition and thereafter evaporating the replacement refrigerant composition in the vicinity of a body to be cooled, wherein the refrigerant composition comprises from about 25 to about 30 mass % difluoromethane (R-32), from about 30 to about 35 mass % pentafluoroethane (R-125), and about 40 mass % tetrafluoroethane (R-134a) whereby these three components are present in the refrigerant composition such that the operating characteristic of positive superheat provided during refrigeration is in the range of from about 8° to about 16° F. for an evaporation temperature range of about 15 to 30° F., in the range of from about 8° to about 12° F. for an evaporation temperature of about −15° F., and in the range of from about 4° to about 8° F. for an evaporation temperature of about −30° F., and wherein the operating characteristics of the refrigerant composition in regard to cooling capacity, efficiency (COP), and mass flow, when employed as the refrigerant in the refrigeration system, are each at least about 95% of those operating characteristics if chlorodifluoromethane (R-22) were to be employed as the refrigerant in said refrigeration system at identical refrigeration conditions.

18. A process for producing low temperature refrigeration in a low temperature refrigeration system according to claim 17 wherein the refrigeration achieves and maintains an evaporator temperature of about 14° F. or below.

19. A process for producing low temperature refrigeration in a low temperature refrigeration system according to claim 18, the process comprising essentially totally replacing the chlorodifluoromethane (R-22) refrigerant in the refrigeration system with the replacement refrigerant composition.

20. A process for producing low temperature refrigeration in a low temperature refrigeration system according to claim 17, the process comprising essentially totally replacing the chlorodifluoromethane (R-22) refrigerant in the refrigeration system with the replacement refrigerant composition.

21. A process for producing low temperature refrigeration in a low temperature refrigeration system according to claim 20, wherein the refrigerant composition comprises about 30 mass % difluoromethane (R-32), about 30 mass % pentafluoroethane (R-125), and about 40 mass % tetrafluoroethane (R-134a).

22. A process for producing low temperature refrigeration in a low temperature refrigeration system according to claim 20 wherein the process requires no adjustment or replacement of any expansion valve of the low temperature refrigeration system to obtain the said operating results.

23. A process for producing low temperature refrigeration in a low temperature refrigeration system according to claim 22, wherein the refrigerant composition comprises about 30 mass % difluoromethane (R-32), about 30 mass % pentafluoroethane (R-125), and about 40 mass % tetrafluoroethane (R-134a).

24. A process for producing low temperature refrigeration in a low temperature refrigeration system according to claim 17 wherein the refrigeration achieves and maintains an evaporator temperature of about 5° F. or below.

25. A process for producing low temperature refrigeration in a low temperature refrigeration system according to claim 24, the process comprising essentially totally replacing the chlorodifluoromethane (R-22) refrigerant in the refrigeration system with the replacement refrigerant composition.

26. A process for producing low temperature refrigeration in a low temperature refrigeration system according to claim 17 wherein the process requires no adjustment or replacement of any expansion valve of the low temperature refrigeration system to obtain the said operating results.

27. A process for producing low temperature refrigeration in a low temperature refrigeration system according to claim 26, wherein the refrigerant composition comprises about 30 mass % difluoromethane (R-32), about 30 mass % pentafluoroethane (R-125), and about 40 mass % tetrafluoroethane (R-134a).

28. A process for producing low temperature refrigeration in a low temperature refrigeration system according to claim 17, wherein the refrigerant composition comprises about 30 mass % difluoromethane (R-32), about 30 mass % pentafluoroethane (R-125), and about 40 mass % tetrafluoroethane (R-134a).

29. A low temperature refrigeration system suitable for use with chlorodifluoromethane (R-22) refrigerant, the low temperature refrigeration system being capable of producing low temperature refrigeration achieving and maintaining an evaporator temperature of below 32° F., the system comprising a condenser, an evaporator and a refrigerant composition, wherein the refrigerant composition comprises from about 25 to about 30 mass % difluoromethane (R-32), from about 30 to about 35 mass % pentafluoroethane (R-125), and about 40 mass % tetrafluoroethane (R-134a) whereby these three components are present in the refrigerant composition such that the operating characteristic of positive superheat provided during refrigeration would be in the range of from about 8° to about 16° F. for an evaporation temperature range of about 15 to 30° F., in the range of from about 8° to about 12° F. for an evaporation temperature of about −15° F., and in the range of from about 4° to about 8° F. for an evaporation temperature of about −30° F., wherein the operating characteristics of the refrigerant composition in regard to cooling capacity, efficiency (COP), and mass flow, when employed as the refrigerant in the refrigeration system, would each be at least about 95% of those operating characteristics if chlorodifluoromethane (R-22) were to be employed as the refrigerant in said refrigeration system at identical refrigeration conditions.

30. A low temperature refrigeration system suitable for use with chlorodifluoromethane (R-22) refrigerant according to claim 29 and being a low temperature refrigeration system that previously employed chlorodifluoromethane (R-22) refrigerant as the refrigerant therein.

31. A low temperature refrigeration system suitable for use with chlorodifluoromethane (R-22) refrigerant according to claim 29 comprising a new low temperature refrigeration system suitable for use with chlorodifluoromethane (R-22) refrigerant.

* * * * *